US010419497B2

(12) United States Patent
Vincent et al.

(10) Patent No.: US 10,419,497 B2
(45) Date of Patent: Sep. 17, 2019

(54) ESTABLISHING COMMUNICATION BETWEEN DIGITAL MEDIA SERVERS AND AUDIO PLAYBACK DEVICES IN AUDIO SYSTEMS

(71) Applicant: Bose Corporation, Framingham, MA (US)

(72) Inventors: Christopher D. Vincent, Needham, MA (US); Trevor Lai, Wayland, MA (US); Stephen Andrew McDonald, Northborough, MA (US)

(*) Notice: Subject to any disclaimer, the term of this patent is extended or adjusted under 35 U.S.C. 154(b) by 831 days.

(21) Appl. No.: 14/674,898

(22) Filed: Mar. 31, 2015

(65) Prior Publication Data

US 2016/0294884 A1 Oct. 6, 2016

(51) Int. Cl.
*H04L 29/06* (2006.01)
*H04L 29/08* (2006.01)

(52) U.S. Cl.
CPC ........ *H04L 65/1069* (2013.01); *H04L 63/029* (2013.01); *H04L 65/4084* (2013.01); *H04L 67/16* (2013.01)

(58) Field of Classification Search
CPC ......... H04L 67/16; H04L 67/104–1097; H04L 67/029; H04L 63/029
See application file for complete search history.

(56) References Cited

U.S. PATENT DOCUMENTS

| 5,087,980 A | 2/1992 | Staffer |
| 5,530,859 A | 6/1996 | Tobias, II et al. |
| 5,655,144 A | 8/1997 | Milne et al. |
| 5,951,690 A | 9/1999 | Baron et al. |
| 5,987,106 A | 11/1999 | Kitamura |
| 6,134,379 A | 10/2000 | LaMacchia |
| 6,285,405 B1 | 9/2001 | Binford, Jr. et al. |
| 6,469,633 B1 | 10/2002 | Wachter |
| 6,631,410 B1 | 10/2003 | Kowalski et al. |

(Continued)

FOREIGN PATENT DOCUMENTS

| EP | 1966692 A1 | 9/2008 |
| WO | 1996/001540 A2 | 1/1996 |

(Continued)

OTHER PUBLICATIONS

Chesire, et al. "Multicast DNS," 2013, IETF RFC 6762.*

(Continued)

*Primary Examiner* — Emmanuel L Moise
*Assistant Examiner* — Julian Chang

(57) ABSTRACT

A method includes receiving via an audio playback device a first multicast transmission (e.g., an SSDP(HTTP)/Bonjour (DNS) presence announcement) from a computer hosting a digital media server. The first multicast transmission provides an indication of the presence of the digital media server (e.g., DLNA music server) on a network (e.g., a LAN). A request for a unicast connection is transmitted via the audio playback device to the digital media server, and, in the absence of a response to the request for a unicast connection, a second multicast transmission is transmitted via the audio playback device. The second multicast transmission includes information that allows the digital media server to establish a connection with the audio playback device to facilitate transmission of a unicast request for content.

16 Claims, 6 Drawing Sheets

(56) References Cited

U.S. PATENT DOCUMENTS

| | | | |
|---|---|---|---|
| 7,023,833 B1 | 4/2006 | Aiello et al. | |
| 7,085,814 B1* | 8/2006 | Gandhi | H04L 29/1232 709/208 |
| 7,165,107 B2* | 1/2007 | Pouyoul | G06F 9/544 709/224 |
| 7,391,791 B2 | 6/2008 | Balassanian et al. | |
| 7,483,538 B2 | 1/2009 | McCarty et al. | |
| 7,643,894 B2 | 1/2010 | Braithwaite et al. | |
| 7,769,865 B1* | 8/2010 | Parker | H04L 65/1069 709/218 |
| 7,917,082 B2 | 3/2011 | Goldberg et al. | |
| 8,234,395 B2 | 7/2012 | Millington | |
| 8,588,949 B2 | 11/2013 | Lambourne et al. | |
| 8,942,252 B2 | 1/2015 | Balassanian et al. | |
| 9,100,424 B1* | 8/2015 | Thomas | H04L 67/12 |
| 9,154,534 B1* | 10/2015 | Gayles | H04L 65/60 |
| 9,195,258 B2 | 11/2015 | Millington | |
| 9,213,357 B2 | 12/2015 | Millington | |
| 9,838,353 B2* | 12/2017 | Roskind | H04L 61/2503 |
| 9,923,725 B2* | 3/2018 | Watsen | H04L 9/3265 |
| 2002/0031196 A1 | 3/2002 | Muller et al. | |
| 2002/0067909 A1 | 6/2002 | Iivonen | |
| 2002/0131398 A1 | 9/2002 | Taylor | |
| 2002/0143855 A1* | 10/2002 | Traversat | G06F 9/4416 709/202 |
| 2003/0050989 A1 | 3/2003 | Marinescu et al. | |
| 2003/0101294 A1* | 5/2003 | Saint-Hilaire | H04L 29/12009 710/11 |
| 2004/0008661 A1 | 1/2004 | Myles et al. | |
| 2004/0136375 A1 | 7/2004 | Koguchi | |
| 2004/0267937 A1* | 12/2004 | Klemets | H04L 29/06 709/227 |
| 2005/0005014 A1* | 1/2005 | Holmes | H04L 29/06 709/227 |
| 2005/0240758 A1* | 10/2005 | Lord | H04L 63/0263 713/153 |
| 2006/0013208 A1 | 1/2006 | Rietschel et al. | |
| 2006/0182100 A1* | 8/2006 | Li | H04L 29/12009 370/389 |
| 2006/0215684 A1* | 9/2006 | Capone | H04L 63/029 370/437 |
| 2007/0142944 A1 | 6/2007 | Goldberg et al. | |
| 2007/0150570 A1* | 6/2007 | Eastham | G06F 9/547 709/223 |
| 2007/0153812 A1* | 7/2007 | Kemp | H04L 29/12509 370/401 |
| 2007/0160034 A1* | 7/2007 | Koretsky | H04L 29/06027 370/352 |
| 2007/0169115 A1* | 7/2007 | Ko | H04L 12/2803 717/174 |
| 2007/0180485 A1* | 8/2007 | Dua | H04L 29/06027 725/114 |
| 2007/0180512 A1* | 8/2007 | Chaudhuri | H04L 63/029 726/12 |
| 2007/0226360 A1* | 9/2007 | Gupta | H04L 67/1097 709/230 |
| 2007/0233879 A1* | 10/2007 | Woods | G06Q 30/02 709/227 |
| 2008/0215669 A1* | 9/2008 | Gaddy | H04L 29/12528 709/203 |
| 2009/0006648 A1* | 1/2009 | Gopalakrishnan | H04L 29/12528 709/245 |
| 2009/0059952 A1* | 3/2009 | Kalofonos | H04L 63/102 370/465 |
| 2009/0094317 A1* | 4/2009 | Venkitaraman | H04L 29/12311 709/203 |
| 2009/0125609 A1* | 5/2009 | Wood | G06F 17/30017 709/219 |
| 2009/0125633 A1* | 5/2009 | Watsen | H04L 63/029 709/229 |
| 2009/0300721 A1* | 12/2009 | Schneider | H04L 63/029 726/3 |
| 2009/0323632 A1* | 12/2009 | Nix | H04L 29/125 370/331 |
| 2009/0327244 A1* | 12/2009 | Rizal | G06F 17/30017 |
| 2009/0327521 A1* | 12/2009 | Huotari | H04L 12/2809 709/240 |
| 2010/0014529 A1* | 1/2010 | Takechi | H04L 29/12509 370/401 |
| 2010/0115119 A1 | 5/2010 | Gallo et al. | |
| 2010/0146126 A1* | 6/2010 | Lin | H04L 29/12509 709/228 |
| 2010/0205309 A1* | 8/2010 | Skog | H04L 12/2818 709/227 |
| 2010/0268832 A1* | 10/2010 | Lucas | H04L 65/1043 709/228 |
| 2010/0325248 A1* | 12/2010 | Camarillo Gonzalez | H04L 67/24 709/220 |
| 2011/0082922 A1* | 4/2011 | Ahn | H04L 12/2805 709/223 |
| 2011/0131518 A1* | 6/2011 | Ohashi | H04L 12/2812 715/769 |
| 2011/0150432 A1* | 6/2011 | Paul | H04L 65/4084 386/297 |
| 2011/0216753 A1* | 9/2011 | Kneckt | H04L 45/70 370/338 |
| 2011/0219123 A1* | 9/2011 | Yang | H04L 29/12103 709/227 |
| 2011/0295974 A1* | 12/2011 | Kashef | H04L 65/1073 709/217 |
| 2012/0087302 A1* | 4/2012 | Chaturvedi | H04L 67/104 370/328 |
| 2012/0136944 A1* | 5/2012 | Stewart | G06F 9/5061 709/206 |
| 2012/0281852 A1* | 11/2012 | Beckmann | H04B 1/20 381/80 |
| 2013/0089026 A1* | 4/2013 | Piper | H04R 5/04 370/328 |
| 2013/0124735 A1* | 5/2013 | Shin | H04L 61/2007 709/226 |
| 2013/0346564 A1* | 12/2013 | Warrick | H04L 41/0893 709/219 |
| 2014/0052770 A1* | 2/2014 | Gran | H04N 21/26258 709/203 |
| 2014/0055554 A1* | 2/2014 | Du | H04N 21/4223 348/14.07 |
| 2014/0178052 A1* | 6/2014 | Kim | H04N 21/4334 386/297 |
| 2014/0280938 A1* | 9/2014 | Kadaba | H04L 67/16 709/225 |
| 2014/0366105 A1* | 12/2014 | Bradley | H04W 12/08 726/5 |
| 2015/0012646 A1* | 1/2015 | Yang | H04L 12/2809 709/224 |
| 2015/0019759 A1* | 1/2015 | Tran | H04L 41/0886 709/245 |
| 2015/0052235 A1* | 2/2015 | Tokunaga | H04L 67/16 709/223 |
| 2015/0054947 A1* | 2/2015 | Dawes | H04L 67/025 348/143 |
| 2015/0058431 A1* | 2/2015 | Srikanth | H04L 51/066 709/206 |
| 2015/0058634 A1* | 2/2015 | Watsen | H04L 41/28 713/175 |
| 2015/0089025 A1* | 3/2015 | Liang | H04L 12/2818 709/219 |
| 2015/0127853 A1* | 5/2015 | Roskind | H04L 61/2503 709/245 |
| 2015/0135265 A1* | 5/2015 | Bagrin | H04L 63/02 726/1 |
| 2015/0244808 A1* | 8/2015 | Wulfsohn | H04L 12/2812 709/228 |
| 2015/0280986 A1* | 10/2015 | Abuan | H04L 67/141 709/221 |
| 2015/0326332 A1* | 11/2015 | Chen | H04J 3/0644 370/503 |

(56) References Cited

U.S. PATENT DOCUMENTS

| | | | |
|---|---|---|---|
| 2015/0365457 A1* | 12/2015 | Dvir | H04L 65/608 709/219 |
| 2016/0142259 A1* | 5/2016 | Rajagopala-Rao | H04L 41/12 370/254 |
| 2016/0164933 A1* | 6/2016 | Kafle | H04L 65/1069 709/219 |
| 2016/0173659 A1* | 6/2016 | Sheu | H04L 61/1511 709/230 |
| 2016/0191461 A1* | 6/2016 | Wang | H04L 65/1069 709/227 |
| 2016/0234320 A1* | 8/2016 | Chang | H04L 67/16 |
| 2016/0295296 A1* | 10/2016 | Zhu | H04N 21/4126 |
| 2017/0039372 A1* | 2/2017 | Koval | G01D 4/004 |
| 2017/0047066 A1* | 2/2017 | Liu | G10L 15/22 |
| 2017/0099153 A1* | 4/2017 | Watsen | H04L 9/3265 |
| 2017/0134422 A1* | 5/2017 | Shieh | H04L 63/1491 |
| 2017/0163691 A1* | 6/2017 | Alon | H04L 63/205 |
| 2017/0302703 A1* | 10/2017 | Buruganahalli | H04L 63/20 |
| 2018/0019890 A1* | 1/2018 | Dawes | H04L 12/2829 |

FOREIGN PATENT DOCUMENTS

| | | |
|---|---|---|
| WO | 98/56135 A2 | 12/1998 |
| WO | 2000/076272 A1 | 12/2000 |
| WO | 0108366 A1 | 2/2001 |
| WO | 2003/058830 A1 | 7/2003 |
| WO | 2007077633 A1 | 7/2007 |

OTHER PUBLICATIONS

"Bonjour Overview," 2013, Apple Inc.*
Srisuresh, et al. "State of Peer-to-Peer (P2P) Communication across Network Address Translators (NATs)," 2008, IETF RFC 5128.*
International Search Report and Written Opinion dated Jun. 30, 2016 for International Application No. PCT/US2016/024947.
Yahun Y Goland Ting Cai Paul Leach Ye Gu Microsoft Corporation Shivaun Albright Hewlett-Packard Company: "Simple Service Discovery Protocol/1.0 Operating without an Arbiter; draft-cai-ssdp-vl-3.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16); URL: http://wftp3.itu.int/av-arch/jctvc-site/, Internet Engineering Task Ford, IETF, CH, No. 3, Oct. 28, 1999.
Fireball DVD and Music Manager DVDM-100, Installation and User's Guide, Escient Manual No. M22003-01A3, Revision 1.2, Jul. 2004, 361 pages.
Escient Fireball E2 User's Manual, P/N: M22004-01A3, copyright 2004, 369 pages.
Escient Fireball AVX & MX Series User's Manual, P/N: M42001-02A1, copyright 2006, 136 pages.
Avega Uses Wireless, UPnP to Network Home Speakers, by Joseph Palenchar, Jan. 5, 2006, https://www.twice.com/product/avega-uses-wireless-upnp-network-home-speakers-2973, 3 pages, retrieved Dec. 18, 2017.
Avega: Wireless Is More, CES 2006, by Wes Phillips, Jan. 4, 2006, https://www.stereophile.com/ces2006/010406avega/index.html, 4 pages, retrieved Dec. 18, 2017.
Avega's Oyster Is a Pearl, by Mike Kobrin, Jan. 6, 2006, https://www.pcmag.com/article2/0,2817,1908704,00.asp, 2 pages, retrieved Dec. 18, 2017.
Escient Fireball DVDM-100 Review, by Nathaniel Wilkins, Dec. 14, 2004, https://www.cnet.com/products/escient-fireball-dvdm-100/review/, 4 pages, retrieved Dec. 18, 2017.
Escient Fireball DVDM-100 Review & Rating, by Bill Howard, Mar. 16, 2004, https://www.pcmag.com/article2/0,2817,1549587,00.asp, 5 pages, retrieved Dec. 18, 2017.
Escient Fireball E2 Digital Music Server Review, by Nathaniel Wilkins, Jun. 14, 2006, https://www.cnet.com/products/escient-fireball-e2-400-400gb/review/, 4 pages, retrieved Dec. 18, 2017.
Escient Fireball E-40 Digital Music Manager Review, by Nathaniel Wilkins, Oct. 12, 2003, https://www.cnet.com/products/escient-fireball-e-40-digital-music-manager/review/, 9 pages, retrieved Jan. 23, 2018.
Escient Fireball SE-80 Digital Music Manager, by Michael Antonoff, Oct. 4, 2005, https://www.soundandvision.com/content/escient-fireball-se-80-digital-music-manager, 5 pages, retrieved Dec. 18, 2017.
Universal Plug and Play, Wikipedia, https://en.wikipedia.org/wiki/Universal_Plug_and_Play, 10 pages, retrieved Jan. 10, 2018.
Wi-Fi Pearl to be Found in Oyster Speakers?, by Digital Trends Staff, Jan. 2, 2006, https://www.digitaltrends.com/home-theater/wi-fi-pearl-to-be-found-in-oyster-speakers/, 4 pages, retrieved Dec. 18, 2017.

* cited by examiner

ESTABLISHING COMMUNICATION BETWEEN DIGITAL MEDIA SERVERS AND AUDIO PLAYBACK DEVICES IN AUDIO SYSTEMS

BACKGROUND

This disclosure relates to audio systems and related devices and methods, and, particularly, to establishing a connection between a computer hosting a digital media server and an audio playback device when a firewall running on the computer blocks in-bound communications from the audio playback device.

SUMMARY

All examples and features mentioned below can be combined in any technically possible way.

One aspect features a method that includes receiving via an audio playback device a first multicast transmission (e.g., an SSDP(HTTP)/Bonjour(DNS) presence announcement) from a computer hosting a digital media server. The first multicast transmission provides an indication of the presence of the digital media server (e.g., DLNA music server) on a network (e.g., a LAN). The audio playback will attempt to make a unicast connection with the digital media server by transmitting a request for a unicast connection (e.g., a connection to a particular IP address and port). If the audio playback device fails to establish the connection, it will send a second multicast transmission which includes information that allows the digital media server to establish a connection with the audio playback device to facilitate transmission of a unicast request for content from the audio playback device to the digital media server.

Implementations may include one of the following features, or any combination thereof.

In some implementations, the information includes an indication that the audio playback device is capable of reverse communication, an identification of a port on the audio playback device through which the connection is to be established, and/or a location (e.g., IP address) of the audio playback device.

In certain implementations, the method includes transmitting a unicast request for content after the digital media server establishes a connection with the audio playback device.

In some examples, in the absence of a response to the request for a unicast connection, a third multicast transmission (e.g., a Bonjour/DNS-based presence announcement) is transmitted via the audio playback device.

The third multicast transmission may be transmitted substantially simultaneously with the second multicast transmission.

In certain examples, the second multicast transmission is transmitted via a first discovery protocol and the third multicast transmission is transmitted via a second discovery protocol.

In some cases, the first multicast transmission is transmitted via the first discovery protocol or the second discovery protocol.

In certain cases, the first discovery protocol uses HTTP messages, and the second discovery protocol uses DNS messages.

In some implementations, a multicast discovery request is transmitted via the audio playback device; and the first multicast transmission is transmitted via the digital media server as a response to the discovery request.

In certain implementations, the computer hosting the digital media server includes a firewall application which inhibits in-bound unicast communications from the audio playback device from reaching the digital media server unless and until the digital media server establishes the connection with the audio playback device.

Another aspect provides a method that includes receiving via a digital media server a first multicast transmission transmitted via an audio playback device, and, in response to the first multicast transmission, establishing communication with the audio playback device based on information included in the first multicast transmission. The information included in the first multicast transmission includes an identification of a port on the audio playback device through which the communication is established.

Implementations may include one of the above and/or below features, or any combination thereof.

In some implementations, the method includes blocking a first unicast communication from the audio playback device via a firewall application running on a computer that hosts the digital media server.

In another aspect, an audio playback device is configured to operably connect to a plurality of digital audio sources. The audio playback device includes (i) a digital-to-analog converter configured to receive a digital representation of content from the digital audio sources and convert to analog form; (ii) an electro-acoustic transducer; (iii) a communication interface; (iv) a processor coupled to the digital-to-analog converter, the electro-acoustic transducer, and the communication interface; and (v) instructions stored on a non-transitory computer-readable media. The instructions, when executed, cause the processor to: (a) receive via the communication interface a first multicast transmission (e.g., an SSDP(HTTP)/Bonjour(DNS) presence announcement) from a computing hosting a digital media server, the first multicast transmission indicating the presence of the digital media server (DLNA music server) on a network (e.g., a LAN); (b) transmit via the communication interface a request for a unicast connection to the digital media server; and (c) in the absence of a response to the request for a uncast connection, transmit via the communication interface a second multicast transmission. The second multicast transmission includes information that allows the digital media server to establish a connection with the audio playback device to facilitate transmission of a unicast request for content.

Implementations may include one of the above and/or below features, or any combination thereof.

In some implementations, the audio playback device includes a set of user-selectable preset indicators. Each indicator in the set of preset indicators is configured to have assigned to it an entity associated with the plurality of digital audio sources.

Another aspect features a non-transitory computer readable storage medium that includes a set of instructions for execution by a processor. The set of instructions, when executed, cause the processor to: (i) receive via an audio playback device a first multicast transmission (e.g., an SSDP(HTTP)/Bonjour(DNS) presence announcement) from a computer hosting a digital media server, the first multicast transmission indicating the presence of the digital media server (DLNA music server) on a network (e.g., a LAN); (ii) transmit via the audio playback device a request for a unicast connection to the digital media server; and (iii) in the absence of a response to the request for a unicast connection, transmit via the audio playback device a second multicast transmission. The second multicast transmission includes information that allows the digital media server to establish a connection with the audio playback device to facilitate transmission of a unicast request for content.

Another aspect provides a non-transitory computer readable storage medium that includes a set of instructions for execution by a processor. The set of instructions, when executed, causes the processor to receive via a digital media server a first multicast transmission transmitted via an audio playback device, and, in response to the first multicast transmission, establish communication with the audio playback device based on information included in the first multicast transmission. The information included in the first (multicast) communication includes an identification of a port on the audio playback device through which the communication is established.

DETAILED DESCRIPTION

This disclosure is based, at least in part, on the realization that it can be beneficial to establish a method through which a computer hosting a digital media server can establish a connection with an audio playback device when a firewall running on the computer otherwise blocks in-bound communications from the audio playback device. This approach could also work if the firewall is running on another computer (i.e., other than the one hosting the digital media server).

System Overview

Figure 1:
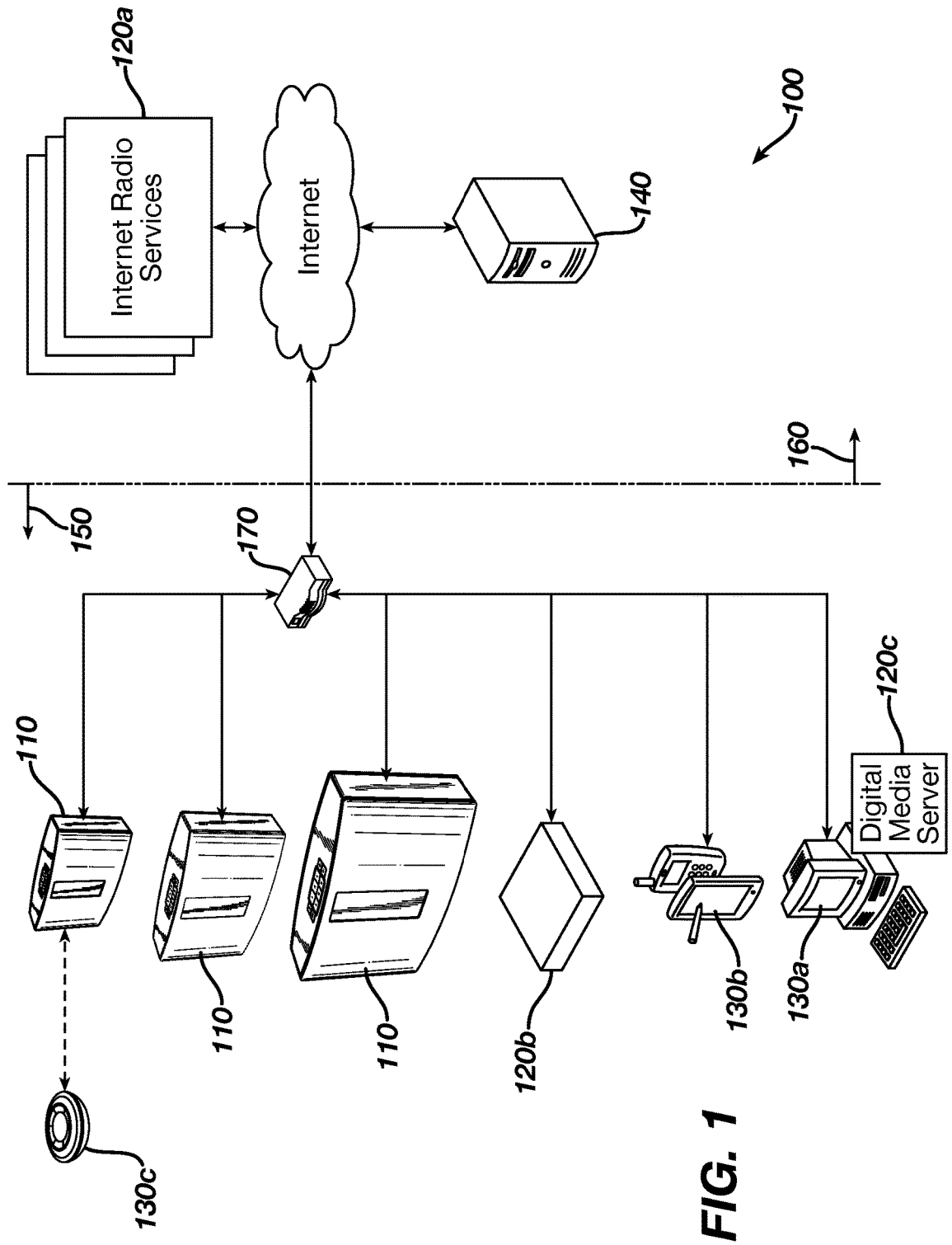
FIG. 1 is a schematic view of an audio system.

Referring to FIG. 1, an audio system 100 for the delivery of digital media (e.g., digital audio) provides for easy, quick access to a variety of digital audio sources through the use of preset assignments. At a very high level, there are four main categories of devices in the audio system 100: (i) audio playback devices 110; (ii) digital audio sources 120a, 120b, 120c (collectively referenced as 120); controllers 130a, 130b, 130c (collectively referenced as 130); and a remote server 140.

The audio playback devices 110 are electronic devices which are capable of rendering audio content. These devices can access stored audio content (e.g., remotely stored audio content) and stream it for playback. In some cases, the audio playback devices 110 may also be capable of playing locally stored content. These devices render audio with the help of audio codecs and digital signal processors (DSPs) available within.

The audio playback devices 110 can communicate with each other. For example, each audio playback device 100 can communicate with the other audio playback devices 110 within the audio system 100 for synchronization. This can be a synchronization of device settings, such as synchronization of preset assignments, or, for synchronization of playback (e.g., such that all or a subset of the audio playback devices 110 play the same content simultaneously and synchronously).

The digital audio sources 120 are devices and/or services that provide access to one or more associated entities for supplying content (e.g., audio streams) to the audio playback devices 110, and which can be located remotely from the audio playback devices 110. An "entity," as used herein, refers to a grouping or collection of content for playback. Exemplary entities include Internet radio stations and user defined playlists. "Content" is data (e.g., an audio track) for playback. "Associated entity" refers to an entity that is associated with a particular audio source. For example, if the digital audio source 120 is an Internet music service such as Pandora®, an example associated entity would be a radio station provided by Pandora®.

For the purposes of the audio system 100, audio streams are considered to be data. They are processed as digital information that is converted to analog before presentation. Data streaming is the method by which data is moved from an audio source 120 to an audio playback device 110. Typically, there are two models for this data movement, push and pull. The audio system 100 is capable of managing this audio (data) streaming in both fashions; descriptions of these processes are as follows.

In a push model, the digital audio source 120 will move the data to the audio playback device 110 at a pace that it desires. The recipient (e.g., one of the audio playback devices 110) of the data will acknowledge the data and the digital audio source 120 will provide more data. This model requires the digital audio source 120 to be managing the throughput characteristics of the audio system 100. In a pull model, the audio playback device 110 will request data from the digital audio source 120 at a rate it desires. This allows the audio playback device 110 to read ahead if data is available.

The digital audio sources 120 each maintain a repository of audio content which can be chosen by the user to play. The digital audio sources 120 can be based on the Digital Living Network Alliance® (DLNA) or other Web based protocols similar to the Hypertext Transfer Protocol (HTTP). Some of the devices and services in this category include Internet based music services 120a such as Pandora®, Spotify®, and vTuner®; network-attached storage (NAS) devices 120b, and a media server daemon 120c (e.g., provided as a component of a computer-based controller).

The digital audio sources 120 include user defined playlists of digital music files available from network audio sources such as network-attached storage (NAS) devices 120b, and a digital music server 120c (DLNA® music server), which may be accessible to the audio playback devices 110 over a local area network such as a wireless (Wi-Fi) or wired (Ethernet) home network 150, as well as Internet radio sites 120a such as Pandora®, vTuner®, Spotify®, etc., which are accessible to the audio playback devices 110 over a wide area network 160 such as the Internet.

The controllers 130 are responsible for controlling the audio playback devices 110 and for browsing the audio sources 120 in the audio system 100. Some of the devices in this category include desktop computers, laptop computers, and mobile devices such as smart phones and tablets. These devices control the audio playback devices 110 via a wireless communication interface (e.g., IEEE 802.11 b g, Bluetooth LE, infrared, etc.). The controllers 130 serve as an online management tool for a user's network enabled audio playback devices 110. The controllers 130 provide interfaces which enable to the user to perform one or more of the following: setup a connection to a Wi-Fi network; create an audio system account for the user, sign into a user's audio system account and retrieve information; add or remove an audio playback device 110 on a user's audio system account; edit an audio playback device's name, and update software; access the audio sources (via the audio playback devices 110); assign an entity (e.g., a playlist or radio station) associated with one of the audio sources 120 to a preset indicator; browse and select recents, where "recents" refers to recently accessed entities; use transport controls (play/pause, next/skip, previous), view "Now Playing" (i.e., content currently playing on an audio playback device 110) and album art; and adjust volume levels.

In some cases, the controllers 130 may include network controllers 130a, 130b and auxiliary controllers 130c. The network controllers 130a, 130b are controllers that communicate with the audio playback devices 110 over a wireless (Wi-Fi) network connection. The network controllers can include primary network controllers 130a and secondary network controllers 130b. The primary network controllers 130a can be utilized for: connecting an audio playback device 110 to a Wi-Fi network; creating a system account for the user; setting up music services; browsing of content for playback; setting preset assignments on the audio playback devices 110; transport control (e.g., play/pause, fast forward/rewind, etc.) for the audio playback devices 110; and selecting audio playback devices 110 for content playback (e.g., single room playback or synchronized multi-room playback). Devices in the primary network controller category can include desktop and laptop computers.

The secondary network controllers 130b may offer some, but not all, of the functions of the primary network controllers 130a. For example, the secondary network controllers 130b may not provide for all of the account setup and account management functions that are offered by the primary network controllers 130a. The secondary network controllers 130b may be used for: music services setup; browsing of content; setting preset assignments on the audio playback devices; transport control of the audio playback devices; and selecting audio playback devices 110 for content playback: single room or synchronized multi-room playback. Devices in the secondary network controller category can include mobile devices such as smart phones and tablets.

The auxiliary controllers 130c communicate wirelessly (e.g., via Bluetooth low energy (BTLE) or IR) with an associated (e.g., paired) one of the audio playback devices (item 110, FIG. 1). The auxiliary controllers 130c may offer limited functionality. The auxiliary controllers 130c may be used for: selecting content for playback via preset indicators setting of preset assignments on the associated one of the audio playback devices 110; and transport control (play/pause, etc.) of the associated audio playback device.

The remote server 140 is a cloud-based server which contains (e.g., within an account database) information related to a user's audio system account. This includes user account information such as the list of the audio playback devices 110 within the system 100, device diagnostic information, preset assignments, etc. The remote server 140 will be connected to by the audio playback devices 110 and by the controllers 130 (e.g., by primary network controllers) for the purpose of preset management, as well as management of audio sources 120 and management of the user's audio system account. Generally, the controllers 130 (e.g., network controllers 130a, 130b) will login to the remote server 140 with a user's login details and 'sync down' the required information to work with.

The audio playback devices 110 and one or more of the controllers 130 are coupled to a local area network (LAN) 150. Other devices such as one or more of the digital audio sources (e.g., a network-attached storage (NAS) device 120b) may also be coupled to the LAN 150. The LAN 150 may be a wired network, a wireless network, or a combination thereof. In one example, the devices (e.g., audio playback devices 110 and controllers 130 (e.g., primary and secondary controllers 130a, 130b)) within the LAN 150 are wirelessly coupled to the LAN 150 based on an industry standard such as IEEE 802.11 b/g. The LAN 150 may represent a network within a home, an office, or a vehicle. In the case of a residential home, the audio playback devices 110 may be arranged in different rooms (e.g., kitchen, dining room, basement, etc.) within the home. The devices within the LAN 150 connect to a user supplied access point 170 (e.g., a router) and subsequently to a wide area network (WAN) 160 (e.g., the Internet) for communication with the other digital audio sources 120 (Internet based music services 120a) and the remote server 140.

Notably, the audio system 100 can provide for the management of presets (a/k/a preset assignments). Presets are a set of (e.g., six) user-defined shortcuts to content, intended to provide quick access to entities associated with the digital music sources 120 from (1 of 6) preset indicators present on each of the audio playback devices 110. In some cases, the preset indicators can be hardware buttons. Alternatively, the preset indicators may be virtual buttons defined by regions on a touch sensitive display. The individual preset indicators can be denoted with numerical identifiers.

The preset indicators on the audio playback devices 110 provide access to their respectively assigned entities irrespective of the associated digital audio source. More specifically, the preset indicators can provide for single press access to the respectively assigned entities, irrespective of the digital audio source. That is, a single press of a preset indicator will start the streaming and rendering of content from an entity assigned to that preset indicator regardless of the audio source providing that entity. In that regard, the presets are said to be source agnostic in that they behave in the same manner regardless of the audio source. In some cases, the single press access can be facilitated with the distribution of tokens for accessing account based audio sources which normally require a user to login with account credentials.

The presets can be global or local at the user's option. The user can select the global or local option, e.g., during set up of the user's system account. If the user's account is set to provide for global presets, the preset assignments will be synchronized on all the audio playback devices 110 across the audio system 100 such that preset assignments on any one of the audio playback devices correspond to respective preset assignments on each of the other audio playback devices (e.g., such that preset indicator "1" on a first one of the audio playback devices is assigned to the same entity as preset indicator "1" on all of the other audio playback devices 110 in the audio system 100), and, such that, if one of the preset assignments is changed on one of the audio playback devices 110, each of the other audio playback devices 110 is automatically updated such that a corresponding change is made to a corresponding preset assignment on each of the other audio playback devices. The synchronization of the preset assignments is managed through a combination of communications between the audio playback devices 110 with the remote server 140, and communications among the audio playback devices 110 themselves. A copy of the global preset assignments is stored locally on each audio playback device 110 associated with the user's account, and a copy of the global preset assignments is also maintained on the remote server 140. Additional details regarding the synchronization of presets among devices is provided in U.S. patent application Ser. No. 13/833,394, the complete disclosure of which is incorporated herein by reference.

As mentioned above, there is a digital media server 120c (e.g., a DLNA® server daemon) that runs on the primary controller 130a (a/k/a computer 130a). The digital media server 120c serves music from the user's computer (e.g., iTunes, Windows Media Player, or files in a folder) to audio playback devices 110. The digital media server 120c is installed as a system service and always runs when the computer 130a is booted. The digital media server 120c can provide the user with the options for enabling and disabling the serving of the selected music library.

The audio playback devices 110 discover the digital media server 120c through a discovery protocol (e.g., Simple Service Discovery Protocol (SSDP) or Bonjour), and can then expose a catalog of content on the digital media server 120c to the user (e.g., via a user interface on one of the controllers 130) to allow the user to navigate through the content and select content from the digital media server 120c for playback via the audio playback device(s) 110. Communication occurs between the controller 130 and the audio playback device 130, and between the audio playback device 110 and the digital media server 120c, such that the audio playback device 110 is the network device that actually retrieves/requests the content from the digital media server 120c.

Generally, the way that the discovery protocol works is as each audio playback device 110 is added to the LAN 150 it will announce itself by transmitting a presence announcement, and it will also transmit a discovery request (e.g., an HTTP UDP discovery request). The presence announcement is a multicast transmission that is transmitted to a multicast port on the other devices on the LAN 150 so that the other network devices know that the transmitting device is on the network. The discovery request is another multicast transmission that is transmitted to a multicast port on the other devices on the LAN to help the transmitting device identify the other devices (e.g., other audio playback devices 130 and the computer/controller 130a hosting the digital media server 120c) on the LAN.

Alternatively or additionally, the computer/controller 130a hosting the digital media server 120c may periodically transmit a presence announcement to allow the other devices on the LAN to know that it is present on the LAN and that it offers a digital media server 120c as a service.

Once the audio playback devices 110 discover the digital media server 120c, the audio playback devices 110 can then attempt to establish a unicast connection to the digital media server 120c so that it can send content requests (e.g., HTTP requests) to the digital media server 120c to retrieve content from the digital media server 120c. These content requests are unicast transmissions addressed only to the digital media server 120c, and may include, inter alia, request for a file (e.g., an xml file) that describes the capabilities of the digital media server 120c, navigation requests to navigate through a menu hierarchy of the digital media server 120c, or requests for audio content.

An interesting problem may occur in configurations in which the computer 130a that hosts the digital media server 120c also hosts a firewall. In such configurations, the firewall generally will not block the multicast transmissions, so the audio playback devices 110 will be able to discover the computer 130a hosting the digital media server 120c and vice-versa. The firewall may, however, block the subsequent attempts to establish a unicast connection coming in from the audio playback devices 110. This is because firewalls typically do not block in-coming transmissions on dedicated multicast ports, but they do often block transmissions coming in on other ports, e.g., to prevent malicious software from accessing the host device over those other ports.

One solution to this problem is to configure the firewall so that it allows incoming communications intended for the digital music server 120c. However, that solution may be beyond the skill of a typical user and it may be difficult to implement automatically (e.g., via software) in a scalable manner since many different firewalls exist and new firewalls may yet be developed and each firewall may require a different configuration. Another solution to this problem would be to deactivate the computer's firewall altogether; however, that could leave the computer 130a vulnerable to the types of attacks that the firewall is designed to prevent.

Figure 2:
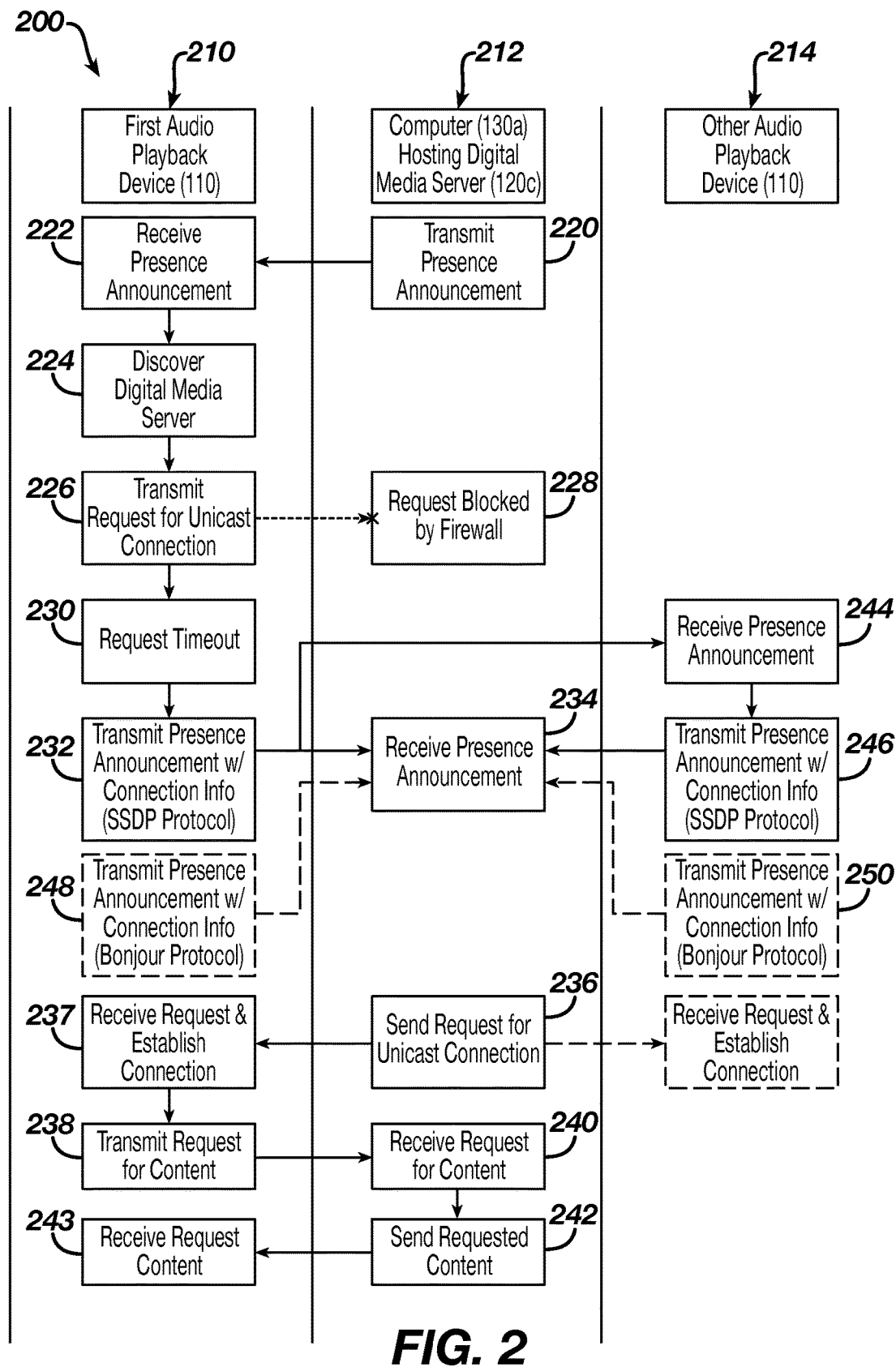
FIG. 2 is a swim lane diagram showing steps of establishing a connection between a computer hosting a digital media server and an audio playback device when a firewall running on the computer blocks in-bound communications from the audio playback device within the audio system of FIG. 1.

The process outlined in FIG. 2 illustrates an alternative solution that can be utilized to overcome this problem. This solution can be implemented automatically through software, and, thus, would not require the user to know that he/she even has a firewall, let alone how to configure it, while also allowing the firewall to continue running to otherwise prevent malicious attacks.

FIG. 2 is a swim lane diagram 200 showing steps of a method for establishing a line of communication between a computer (controller 130a) hosting a firewall and a digital media server 120c and an audio playback device 110. "Swim lane" diagrams may be used to show the relationship between the various "actors" in the processes and to define the steps involved in the processes. FIG. 2 may equally represent a high-level block diagram of components of the invention implementing the steps thereof. The steps of FIG. 2 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Referring to FIG. 2, three swim lanes are shown including a lane (210) for a first one of the audio playback devices 110, a lane (212) for the computer/controller 130a hosting the digital media server 120c, and a lane (214) for the other audio playback devices 110. At step 220, the computer 130a hosting the digital media server 120c transmits a multicast presence announcement (e.g., an SSDP/HTTP announcement) on the LAN. The presence announcement is an announcement by the computer 130a that it is present on the LAN 150 and includes an indication of the services that it offers, such as the digital media server 120c. This transmission may be a periodic transmission (e.g., occurring every 30 seconds or 60 seconds), or may be transmitted in response to a discovery request received from one of the other devices on the network.

A first audio playback device (i.e., a first one of the audio playback devices 110, FIG. 1) receives the presence announcement from the computer 130a via a multicast channel/port (step 222), and, based on the received transmission, identifies (a/k/a "discovers") the availability of the digital media server 120c on the LAN 150 (step 224). At step 226, the first audio playback device 110 transmits a request for a unicast connection. That is, the audio playback device 110 via its networking code (e.g., provided by the Linux OS) attempts to establish a TCP connection to a particular IP address and port.

At step 228, the request for a unicast connection is blocked via a firewall running on the computer 130a that is hosting the digital media server 120c. In general, firewalls will not block in-coming communications on a dedicated multicast channel/port; so, the discovery requests and other multicast announcements will pass through. However, the subsequent request to establish a unicast connection may be blocked by the firewall.

After a pre-determined period of no response from the digital music server 120c, the request for a unicast connection will timeout (step 230). When this occurs, the first audio playback device 110 will then transmit a multicast presence announcement and include with the transmission an indication that the first audio playback device 110 is capable of reverse communication along with an identification of a port number for communication (step 232).

The computer 130a will receive the multicast presence announcement from the first audio playback device 110 (step 234) and, based on the additional information provided in the transmission, will conclude that the first audio playback device 110 attempted to reach the digital media server 120c and will then use that additional information to establish a connection to the first audio playback 110 via the port number identified in the presence announcement. That is, the digital media server application will initiate a connection using the host computer's networking stack. In that regard, the digital media server 120c will send a request to establish a unicast connection via the port number identified in the presence announcement (step 236). That request will get through the firewall, and, at step 237, the first audio playback device 110 will receive the request from the digital media server 120c via the identified port number and a unicast connection will be established. This essentially establishes a line of communication between the first audio playback device 110 and the digital media server 120c which will not be blocked by the host computer's firewall.

Once the connection is established with the digital media server 120c, the first audio playback device 110 can transmit a unicast request for content (a/k/a "content request") to the digital media server 120c over the newly established unicast connection (step 238). This unicast request for content may be a request to download a file (e.g., an .xml file) that describes what the digital media server name is, who owns it, who developed it, and what music server capabilities it has. Alternatively or additionally, the request may include a request to navigate into a menu on the server 120c, or a request to play a particular song in a particular server location (e.g., by URL). The unicast request may be prompted by input received from the user either through one of the controllers 130, or directly though a user interface on the first audio playback device 110 itself, such as will occur when the user presses a preset indicator that is associated with content on the digital media server 120c. The request will be received by the digital media server 120c without being blocked by the host computer's firewall (step 240). The digital media server 120c can then send the requested content (step 242) to the first audio playback device 110, and the first audio playback device 110 will receive the requested content via the unicast connection (step 243).

In some cases, when the first audio playback device 110 fails to reach the digital media server 120c and, as a result, transmits a multicast presence announcement with the information necessary for the computer 130c to establish reverse communication with the first audio playback device 110, the other audio playback devices 110 on the network will also receive the multicast transmission from the first audio playback device 110 (step 244), and, in response, will each transmit their own respective multicast presence announcement with information that will allow the computer 130a to also connect to each of the other audio playback devices 110 (step 246). This will establish unicast connections between the digital media server 120c and each of those other audio playback devices 110 so that subsequent unicast content requests from those other audio playback devices 110 will not be blocked by the firewall running on the computer 130a.

In some instances, the first audio playback device 110 can be configured to transmit multiple multicast presence announcements substantially simultaneously (e.g., one after the other). For example, Microsoft Windows devices have a tendency to be SSDP centric, whereas Apple devices have a tendency to utilize Bonjour—a DNS based service discovery. With Apple devices, the above described reversal mechanism may not work with SSDP/HTTP-based announcements because Apple devices sometimes block the SSDP ports. For this reason, the first audio playback device 110 may be configured such that, when a request for a unicast connection to the digital media server 120c times out, the first audio playback device 110 not only transmits an SSDP/HTTP-based presence announcement (step 232) with the above mentioned additional information, but also transmits a corresponding Bonjour/DNS-based presence announcement (step 248) with the additional information substantially simultaneously so that, even if the SSDP ports are blocked, e.g., by an Apple device hosting the digital media server 120c, the multicast presence announcement may still reach the computer 130a via the Bonjour protocol. Likewise, the other audio playback devices 110 can also be configured such that, when they see a multicast presence announcement with the reverse communication information from the first audio playback device 110, they too transmit their own respective multicast presence announcements via both discovery protocols as well (steps 246 and 250), and the digital media server 120c may similarly send requests to establish unicast connections via respective ports on each of the other audio playback devices.

Audio Playback Devices

Figure 3A:
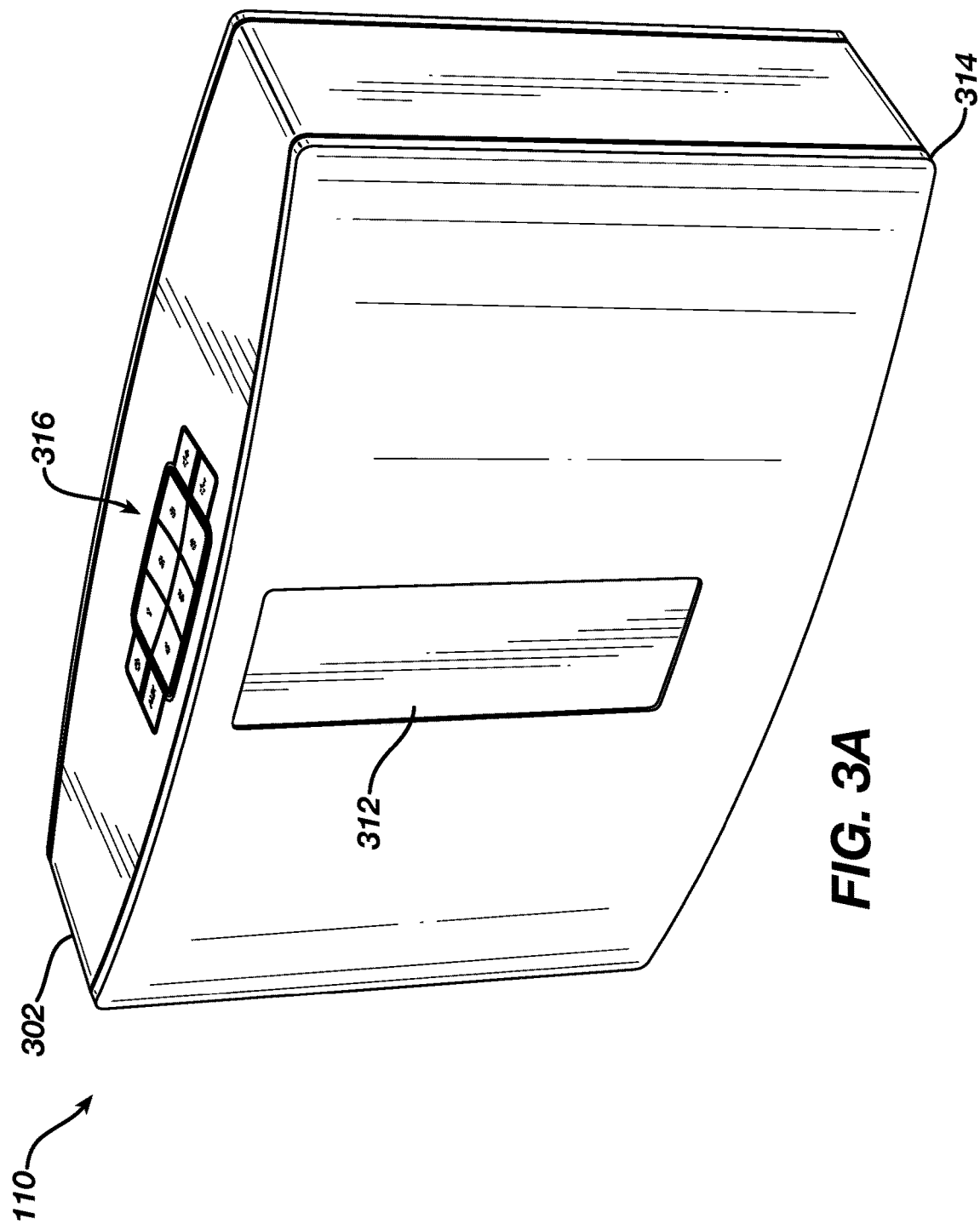
FIGS. 3A and 3B are perspective and top plan views, respectively, of an exemplary audio playback device from the audio system of FIG. 1.
Figure 3B:
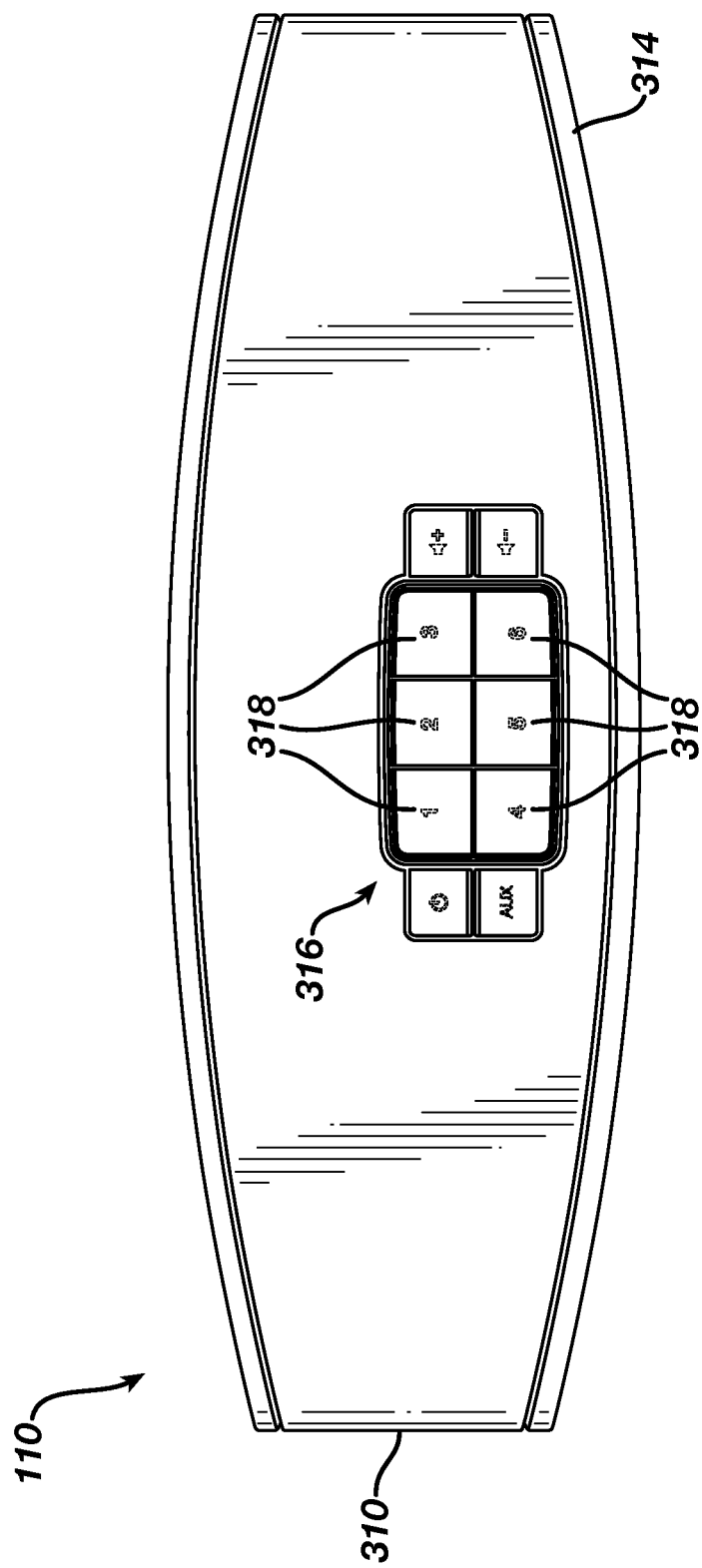
Figure 3C:
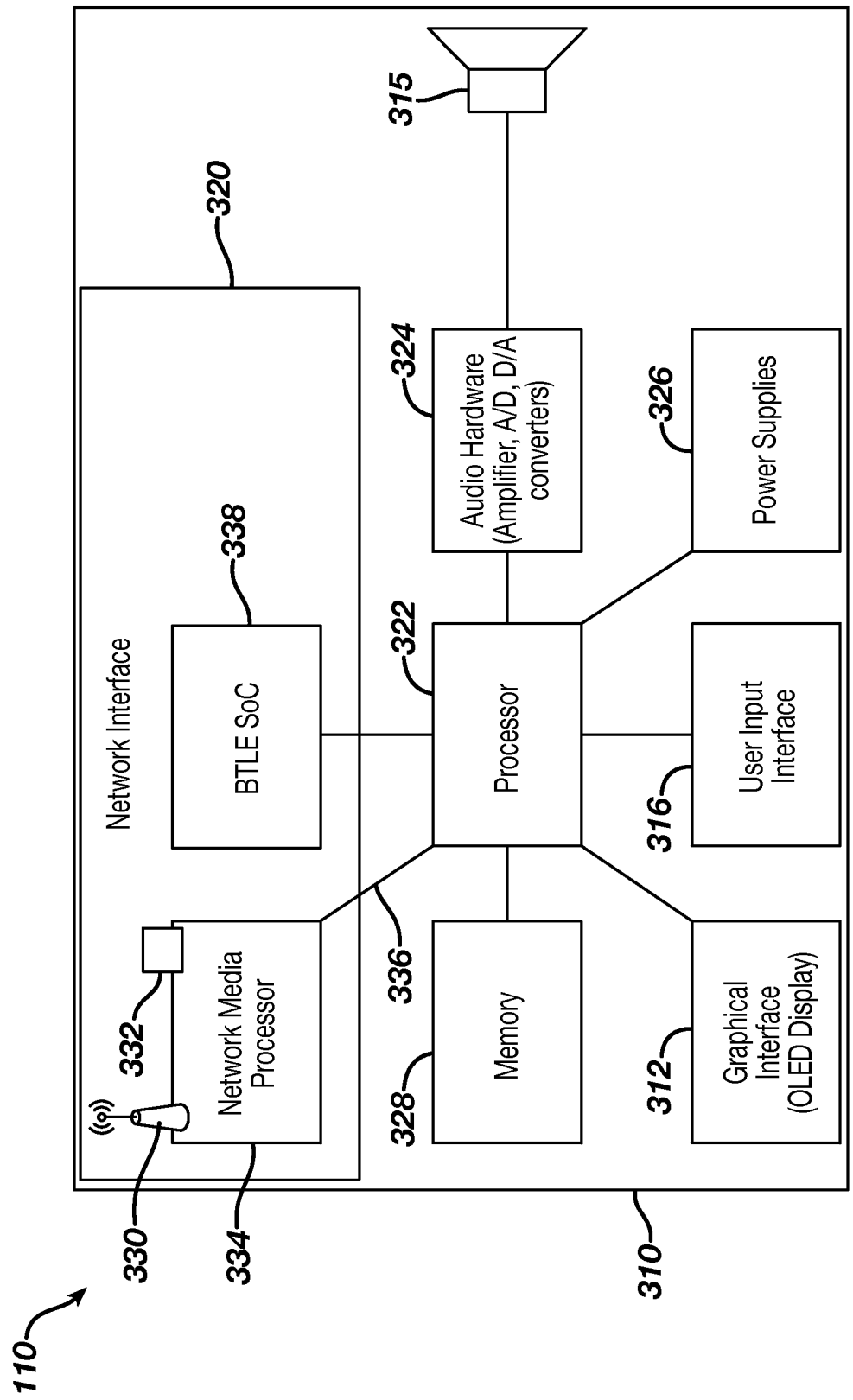
FIG. 3C is a block diagram of the audio playback device of FIG. 3A.

An exemplary audio playback device 110 will now be described in greater detail with reference to FIGS. 3A through 3C. Referring to FIG. 3A, an audio playback device 110 includes an enclosure 310 and on the enclosure 310 there resides a graphical interface 312 (e.g., an OLED display) which can provide the user with information regarding currently playing ("Now Playing") music and information regarding the presets. A screen 314 conceals one or more electro-acoustic transducers 315 (FIG. 3C). The audio playback device 110 also includes a user input interface 316. As shown in FIG. 3B, the user input interface 316 includes a plurality of preset indicators 318, which are hardware buttons in the illustrated example. The preset indicators 318 (numbered 1-6) provide the user with easy, one press access to entities assigned to those buttons. That is, a single press of a selected one of the preset indicators 318 will initiate streaming and rendering of content from the assigned entity.

The assigned entities can be associated with different ones of the digital audio sources (items 120a, 120b, 120c, FIG. 1) such that a single audio playback device 110 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Notably, the preset indicators 318 operate in the same manner, at least from the user's perspective, regardless of which entities are assigned and which of the digital audio sources provide the assigned entities. That is, each preset indicator 318 can provide for single press access to its assigned entity whether that entity is a user-defined playlist of digital music provided by an NAS device or an Internet radio station provided by an Internet music service.

With reference to FIG. 3C, the audio playback device 110 also includes a network interface 320, a processor 322, audio hardware 324, power supplies 326 for powering the various audio playback device components, and memory 328. Each of the processor 322, the graphical interface 312, the network interface 320, the processor 322, the audio hardware 324, the power supplies 326, and the memory 328 are interconnected using various buses, and several of the components may be mounted on a common motherboard or in other manners as appropriate.

The network interface 320 provides for communication between the audio playback device 110 and the controller (e.g., items 130a-c, FIG. 1), the remote server (item 140, FIG. 1), the audio sources (items 120, FIG. 1) and other audio playback devices 110 via one or more communications protocols. The network interface 320 may provide either or both of a wireless interface 330 and a wired interface 332. The wireless interface 330 allows the audio playback device 110 to communicate wirelessly with other devices in accordance with a communication protocol such as such as IEEE 802.11 b/g. The wired interface 332 provides network interface functions via a wired (e.g., Ethernet) connection.

In some cases, the network interface 320 may also include a network media processor 334 for supporting Apple Air-Play® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the LAN 150, the user can then stream music to the network connected audio playback devices 110 via Apple AirPlay®. A suitable network media processor is the DM870 processor available from SMSC of Hauppauge, N.Y. The network media processor 334 provides network access (i.e., the Wi-Fi network and/or Ethernet connection can be provided through the network media processor 334) and AirPlay® audio. AirPlay® audio signals are passed to the processor 322, using the I²S protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device.

All other digital audio coming from network packets comes straight from the network media processor 334 through a USB bridge 336 to the processor 322 and runs into the decoders, DSP, and eventually is played back (rendered) via the electro-acoustic transducer(s) 315.

The network interface 310 can also include a Bluetooth low energy (BTLE) system-on-chip (SoC) 338 for Bluetooth low energy applications (e.g., for wireless communication with a Bluetooth enabled controller (item 130c, FIG. 1)). A suitable BTLE SoC is the CC2540 available from Texas Instruments, with headquarters in Dallas, Tex.

Streamed data pass from the network interface 320 to the processor 322. The processor 322 can execute instructions within the audio playback device (e.g., for performing, among other things, digital signal processing, decoding, and equalization functions), including instructions stored in the memory 328. The processor 322 may be implemented as a chipset of chips that include separate and multiple analog and digital processors. The processor 322 may provide, for example, for coordination of other components of the audio playback device 110, such as control of user interfaces, applications run by the audio playback device 110. A suitable processor is the DA921 available from Texas Instruments.

The processor 322 provides a processed digital audio signal to the audio hardware 324 which includes one or more digital-to-analog (D/A) converters for converting the digital audio signal to an analog audio signal. The audio hardware 324 also includes one or more amplifiers which provide amplified analog audio signals to the electroacoustic transducer(s) 315 for playback. In addition, the audio hardware 324 may include circuitry for processing analog input signals to provide digital audio signals for sharing with other devices in the acoustic system 100.

The memory 328 may include, for example, flash memory and/or non-volatile random access memory (NVRAM). In some implementations, instructions (e.g., software) are stored in MEMORY 328. The instructions, when executed by one or more processing devices (e.g., the processor 322), perform one or more processes, such as those described above (e.g., with respect to FIG. 2). The instructions can also be stored by one or more storage devices, such as one or more computer- or machine-readable mediums (for example, the memory 328, or memory on the processor). The instructions may include instructions for performing decoding (i.e., the software modules include the audio codecs for decoding the digital audio streams), as well as digital signal processing and equalization.

The instructions may also include instructions for enabling certain "browsing" functionality. That is, at least in some cases, the controllers (items 130a-c, FIG. 1) serve as graphical remote controls for the audio playback devices 110 and do not communicate with the digital audio sources 120 (FIG. 1) directly, but, instead, communicate with the digital audio sources 120 via the audio playback devices 110.

Computer/Controller

Figure 4:
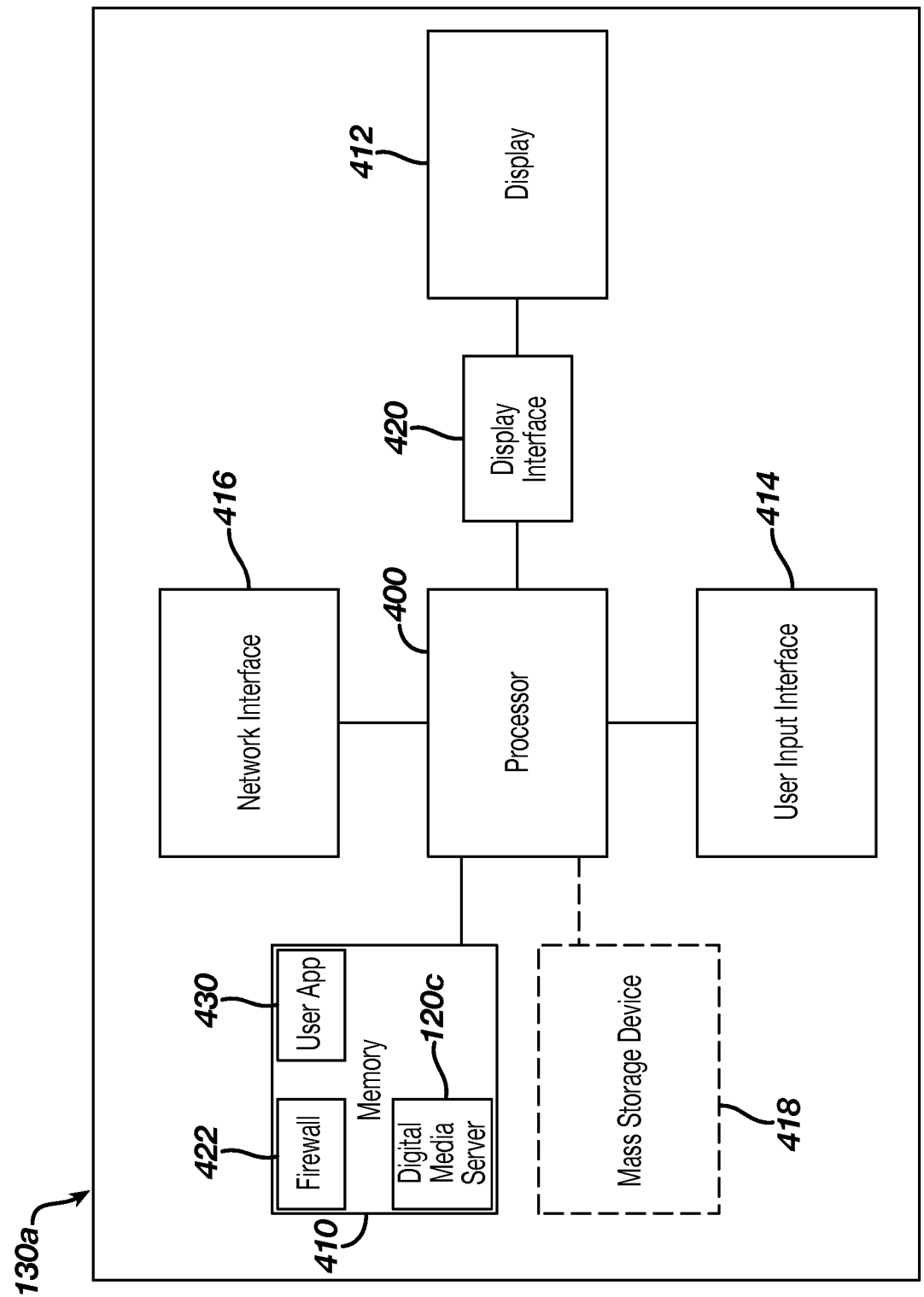
FIG. 4 is a block diagram of an exemplary computer/controller from the audio system of FIG. 1.

Referring to FIG. 4, an exemplary computer 130a includes a processor 400, a memory 410, a display 412, a user input interface 414, and a network interface 416, among other components. The controller 130 may also be provided with a mass storage device 418, such as a hard drive, a micro-drive, or other device, to provide additional storage. Each of the processor 400, the memory 410, the display 412, and the network interface 416 are interconnected using various buses, and several of the components may be mounted on a common motherboard or in other manners as appropriate.

The processor 400 can execute instructions (e.g., software) within the controller 130, including instructions stored in the memory 410 or in a secondary storage device (e.g., mass storage device 418). The processor 400 may be implemented as a chipset of chips that include separate and multiple analog and digital processors. The processor 400 may provide, for example, for coordination of other components of the controller 130a, such as control of user interfaces, applications run by the controller 130, and network communication by the controller 130. The processor 400 may communication with a user through the display 412 and the user input interface 414.

The processor 400 may communicate with the user through a display interface 420 coupled to the display 412. The display 412 may include an LCD monitor, or a touch sensitive display (e.g., in the case of a mobile device). The display interface 420 may comprise appropriate circuitry for driving the display 412 to preset graphical and other information to the user.

The user input interface 414 may include one or more user input devices such as a keyboard, a pointer device such as a mouse, and/or a touch sensitive display. In some cases, the same device (e.g., a touch sensitive display) may be utilized to provide the functions of the display 412 and the user input interface 414.

The network interface 416 facilitates wireless communication (e.g., Wi-Fi, Bluetooth, IR, etc.) with one or more of the audio playback devices (item 110, FIG. 1) via a corresponding network interface (item 320, FIG. 3C) on the audio playback device 110.

The memory 410 stores information within the controller 130a. In some implementations, the memory 410 is a volatile memory unit or units. In some implementations, the memory 410 is a non-volatile memory unit or units. The memory 410 may also be another form of computer-readable medium, such as magnetic or optical disk.

The mass storage device 418 is capable of providing mass storage for the controller 130a. In some implementations, the mass storage device 418 may be or contain a computer readable medium, such as a floppy disk device, a hard disk device, an optical disk device, or a tape device, a flash memory or other similar solid state memory device, or an array of devices.

Instructions (e.g., software) can be stored in an information carrier. The instructions, when executed by one or more processing devices (e.g., the processor 400), perform one or more processes, such as those described above (e.g., with reference to FIG. 2). The instructions can also be stored by one or more storage devices such as computer- or machine-readable mediums (for example, the memory 410, the storage device 418, or memory in the processor 400). The software can include, inter alia, the digital media server 120c, a firewall 422, and a user application 430. The user application 430 is run by the user and can be started from a daemon in response to a Region Icon command. The user application 430 includes computer-executable instructions (e.g., software modules) for system account creation and management (i.e., creating and managing a user's system account); audio playback device registration and configuration; network management; preset/recent management; transport control (e.g., play/pause, rewind/forward, etc.) for the audio playback devices; initiating firmware updates for the audio playback devices; music services setup; and context sensitive help. Each of these functions of the user application 430 can be provided by a corresponding software module.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

What is claimed is:

1. A method comprising:
    receiving via an audio playback device a first multicast transmission from a computer hosting a digital media server, the first multicast transmission indicating the presence of the digital media server on a network;
    transmitting via the audio playback device a first request for unicast connection to the digital media server; and
    in response to the first request for unicast connection being blocked via a firewall running on the computer hosting the digital media server, transmitting via the audio playback device a second multicast transmission,
    wherein the firewall running on the computer hosting the digital media server permits discovery requests and other multicast announcements and blocks requests to establish a unicast connection,
    wherein the second multicast transmission comprises information that allows the digital media server to establish a connection with the audio playback device to facilitate transmission of a unicast request for content from the audio playback device to the digital media server;
    in response to receiving the second multicast transmission at the digital media server, transmitting via the digital media server a second request for a unicast connection using the information provided in the second multicast transmission;
    receiving via the audio playback device the second request; and
    in response, establishing a unicast connection with the digital media server at the audio playback device.

2. The method of claim 1, wherein the information comprises an indication that the audio playback device is capable of reverse communication.

3. The method of claim 1, wherein the information comprises an identification of a port on the audio playback device through which the connection is to be established.

4. The method of claim 1, wherein the information comprises a location of the audio playback device.

5. The method of claim 1, further comprising:
    transmitting the unicast request for content after the digital media server establishes a connection with the audio playback device.

6. The method of claim 1, further comprising:
    in response to the first request for unicast connection being blocked via the firewall running on the computer hosting the digital media server, transmitting via the audio playback device a third multicast transmission,
    wherein the information that allows the digital media server to establish the connection with the audio playback device to facilitate transmission of the unicast request for content from the audio playback device to the digital media server includes an indication that the audio playback device is capable of reverse communication and an identification of a port number for communication.

7. The method of claim 6, wherein the third multicast transmission is transmitted substantially simultaneously with the second multicast transmission.

8. The method of claim 6, wherein the second multicast transmission is transmitted via a first discovery protocol and the third multicast transmission is transmitted via a second discovery protocol, wherein the second discovery protocol is distinct from the first discovery protocol.

9. The method of claim 8, wherein the first multicast transmission is transmitted via the first discovery protocol or the second discovery protocol.

10. The method of claim 8, wherein the first discovery protocol uses HTTP messages, and wherein the second discovery protocol uses DNS messages.

11. The method of claim 8, wherein the first discovery protocol is Simple Service Discovery Protocol (SSDP) and the second discovery protocol is Bonjour discovery protocol.

12. The method of claim 1, further comprising:
transmitting a multicast discovery request via the audio playback device; and
transmitting the first multicast transmission via the digital media server as a response to the discovery request.

13. The method of claim 6, further comprising:
receiving the second multicast transmission at one or more other audio playback devices; and
in response to receiving the second multicast transmission at the one or more other audio playback devices, transmitting via the one or more other audio playback devices one or more additional multicast presence announcements,
wherein the one or more additional multicast presence announcements include information that allows the digital media server to establish respective connections with the one or more other audio playback devices to facilitate transmission of unicast requests for content from the one or more other audio playback devices to the digital media server.

14. An audio playback device configured to operably connect to a plurality of digital audio sources, the audio playback device comprising:

a digital-to-analog converter configured to receive a digital representation of content from the digital audio sources and convert to analog form;
an electro-acoustic transducer;
a communication interface;
a processor coupled to the digital-to-analog converter, the electro-acoustic transducer, and the communication interface; and
instructions stored on a non-transitory computer-readable media that, when executed, cause the processor to:
receive via the communication interface a first multicast transmission from a computing hosting a digital media server, the first multicast transmission indicating the presence of the digital media server on a network;
transmit via the communication interface a first request for a unicast connection to the digital media server;
in response to the first request for unicast connection being blocked via a firewall running on the computer hosting the digital media server, transmit via the communication interface a second multicast transmission,
wherein the firewall running on the computer hosting the digital media server permits discovery requests and other multicast announcements and blocks requests to establish a unicast connection,
wherein the second multicast transmission comprises information that allows the digital media server to establish a connection with the audio playback device to facilitate transmission of a unicast request for content
receive via the communication interface a second request for a unicast connection transmitted by the digital media server as a response to the second multicast transmission, and, in response,
establish the unicast connection with the digital media server.

15. The audio playback device of claim 14, wherein the audio playback device comprises a set of user-selectable preset indicators, wherein each indicator in the set of preset indicators is configured to have assigned to it an entity associated with the plurality of digital audio sources.

16. The audio playback device of claim 15, wherein each preset indicator provides single press access to the respective entity associated with the plurality of digital audio sources.

* * * * *